(12) United States Patent
Wang et al.

(10) Patent No.: US 11,991,433 B2
(45) Date of Patent: May 21, 2024

(54) CAMERA AND MICROPHONE ENABLING SHUTTERS

(71) Applicant: HEWLETT-PACKARD DEVELOPMENT COMPANY, L.P., Spring, TX (US)

(72) Inventors: Ching-Ming Wang, Taipei (TW); Hui-Jen Tseng, Taipei (TW); Yen-Chi Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 143 days.

(21) Appl. No.: 17/777,838

(22) PCT Filed: Dec. 6, 2019

(86) PCT No.: PCT/US2019/065026
§ 371 (c)(1),
(2) Date: May 18, 2022

(87) PCT Pub. No.: WO2021/112878
PCT Pub. Date: Jun. 10, 2021

(65) Prior Publication Data
US 2022/0417398 A1 Dec. 29, 2022

(51) Int. Cl.
*H04N 23/55* (2023.01)
*G06F 1/16* (2006.01)
(Continued)

(52) U.S. Cl.
CPC .......... *H04N 23/55* (2023.01); *G06F 1/1613* (2013.01); *G06F 1/1686* (2013.01);
(Continued)

(58) Field of Classification Search
CPC ........ H04N 23/51; H04N 23/55; H04N 23/57; G06F 1/1613; G06F 1/1686;
(Continued)

(56) References Cited

U.S. PATENT DOCUMENTS 8,724,020 B1 5/2014 Haddad
8,902,318 B1 * 12/2014 Haddad ................. H04N 23/45
348/222.1
(Continued)

FOREIGN PATENT DOCUMENTS

WO 2017/055672 A1 4/2017
WO 2019/059911 A1 3/2019
(Continued)

*Primary Examiner* — Twyler L Haskins
*Assistant Examiner* — Akshay Trehan
(74) *Attorney, Agent, or Firm* — Knobbe, Martens, Olson & Bear, LLP

(57) ABSTRACT

Examples disclosed herein provide a computing device. As an example, the computing device includes a housing having an opening extending through the housing, to accommodate a lens of a camera. The computing device includes a shutter to selectively obscure the opening, where the shutter is slidable between a first position and a second position. While in the first position, the shutter is to obscure the opening while a microphone of the computing device is enabled and, while in the second position, the shutter is to obscure the opening and disable the microphone.

15 Claims, 3 Drawing Sheets

(51) Int. Cl.
  *G06F 21/62*  (2013.01)
  *G06F 21/82*  (2013.01)
(52) U.S. Cl.
  CPC ........ *G06F 1/1688* (2013.01); *G06F 21/6245* (2013.01); *G06F 21/82* (2013.01)
(58) Field of Classification Search
  CPC .... G06F 1/1688; G06F 21/6245; G06F 21/82; H04R 2499/11; H04R 29/004; H04R 1/02
  See application file for complete search history.

(56) References Cited

U.S. PATENT DOCUMENTS

| | | | |
|---|---|---|---|
| 8,988,532 B2 | 3/2015 | Soffer | |
| 9,871,974 B2 * | 1/2018 | Robinson | H04N 23/73 |
| 2014/0198439 A1 * | 7/2014 | De Pietro | G06F 1/16 |
| | | | 361/679.02 |
| 2015/0163385 A1 * | 6/2015 | Haddad | G03B 17/565 |
| | | | 348/374 |
| 2016/0352384 A1 * | 12/2016 | Ageishi | H04M 1/185 |
| 2017/0185738 A1 * | 6/2017 | Moharir | H04N 5/77 |
| 2018/0109712 A1 * | 4/2018 | Robinson | G06F 3/167 |
| 2019/0109989 A1 * | 4/2019 | Haddad | H04N 23/45 |
| 2020/0228688 A1 * | 7/2020 | Horiuchi | G03B 31/00 |

FOREIGN PATENT DOCUMENTS

| | | | | |
|---|---|---|---|---|
| WO | WO-2019059911 A1 * | 3/2019 | | G06F 1/16 |
| WO | 2019/117938 A1 | 6/2019 | | |

* cited by examiner

CAMERA AND MICROPHONE ENABLING SHUTTERS

BACKGROUND

Computing devices, such as laptop computers, desktop computers, and smartphones, may include a camera (e.g., webcam). The camera may capture electronic images such as photos and/or video images. The camera may capture the electronic images responsive to an input such as an input provided by a user and/or an application, among other possibilities. The camera may be located on an external surface of the computing device, in order to promote capture of the electronic images. In addition to the camera, the external surface of the computing devices may include a microphone for capturing audio.

DETAILED DESCRIPTION

Privacy is a concern for users of such computing devices including cameras and/or microphones. For instance, control may be gained of a camera or microphone in a computing device for a variety of undesired reasons. For instance, control may be acquired of the camera included in the computing device and/or access may be gained to electronic images captured by the camera, unbeknownst to a user of the computing device. In some approaches, this may be possible because the camera may be visible and accessible to the user at all times during operation of the computing device. For example, in some approaches the camera (or microphone) may be mounted on an exterior portion of the computing device (e.g., on a display of the computing device), where it may be visible and accessible to the user during operation of the computing device.

Examples disclosed herein provide a shutter for selectively obscuring an opening found on the computing device, such as for a lens of the camera, according to an example. In addition, as further described, the shutter may be slidable between various positions, in order to independently enable or disable the microphone from the obscuring of the opening. As a result, a user may choose between either exposing or obscuring the opening, thereby controlling capture of electronic images, separate from whether the microphone is made available for capturing audio. For example, if the user desires to block capture by the camera but enable the microphone for audio capture, they may slide the shutter to a particular position. Similarly, if the user desires to make the camera available for image capture but disable the microphone from capturing audio, they may slide the shutter to another position.

Figure 1:
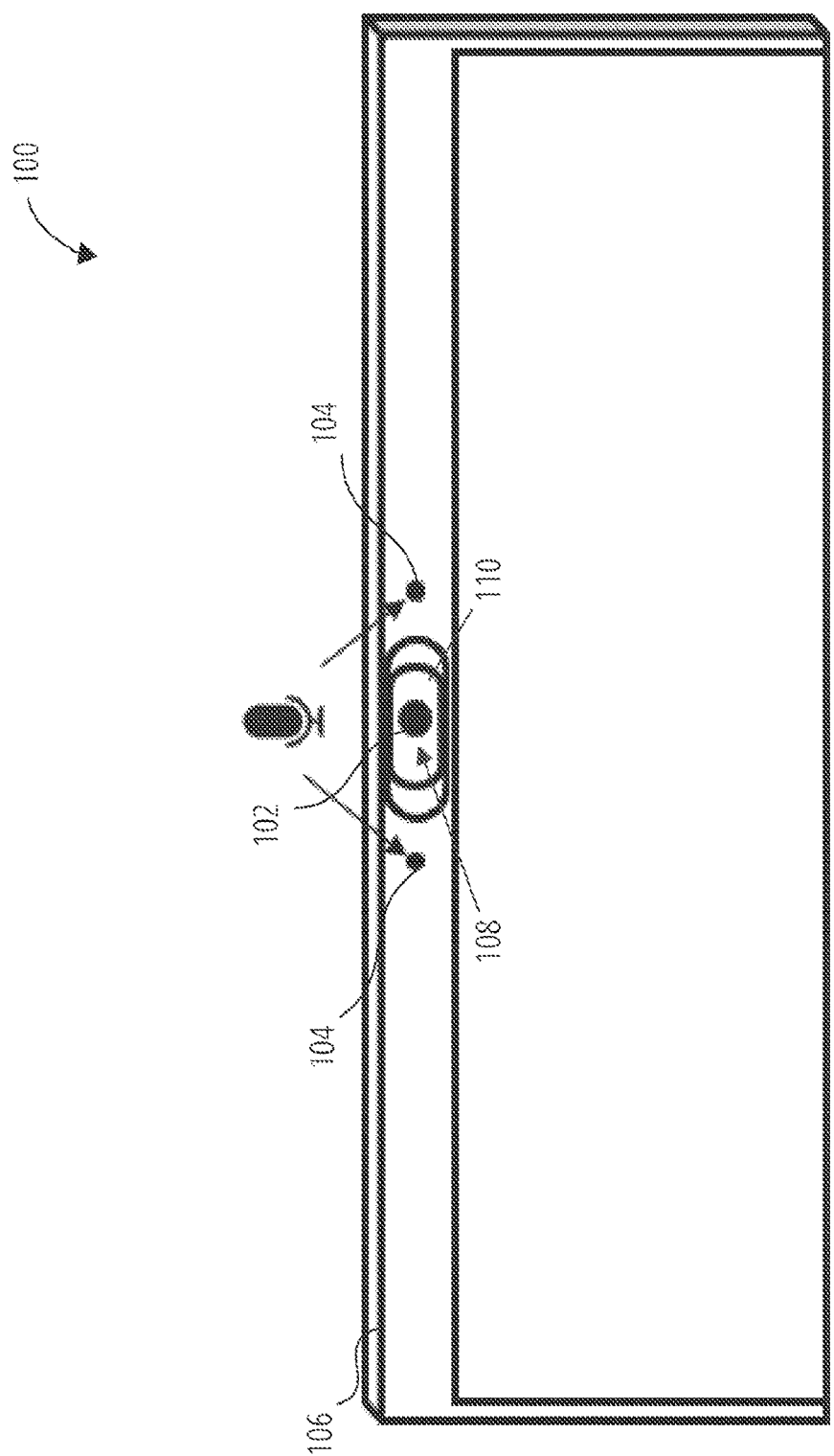
FIG. 1 illustrates a computing device including a housing with a shutter that is slidable between various positions, in order to provide various degrees of privacy measures to users of the computing device, according to an example.

With reference to the figures, FIG. 1 illustrates a computing device 100 including a housing 106 with a shutter 110 that is selectively slidable between various positions, in order to provide various degrees of privacy measures to users of the computing device 100 (e.g., blocking between audio capture and/or video capture), according to an example. The computing device 100 includes a camera comprising a lens 102. As an example, an opening 108 extending, for example, through a bezel of the housing 106, may accommodate the lens 102 and, as further described, the shutter 110 may be slidable between different positions to either expose or obscure the opening 108, thereby controlling whether the camera is made available for use.

In addition to utilizing the shutter 110 to either obscure or expose the opening 108, the shutter 110 may be slidable between various positions to either enable or disable audio capture. Referring to FIG. 1, computing device 100 includes a microphone 104. Although two microphones 104 are illustrated, the number of microphones, and their respective placement, may vary. As an example, the circuitry associated with microphone 104 uses a clock signal and a data signal to transmit sound captured by the microphone 104 to a processor of the computing device 100, for example, for audio processing. As an example, the data signal may be disconnected, based on a position of the shutter 110, thereby controlling whether audio is captured by the microphone 104 and transmitted to the processor. As further described, the circuitry associated with the microphone 104 may include switches that either connect or disconnect the data signal, based on a position of the shutter 110.

Figure 2:
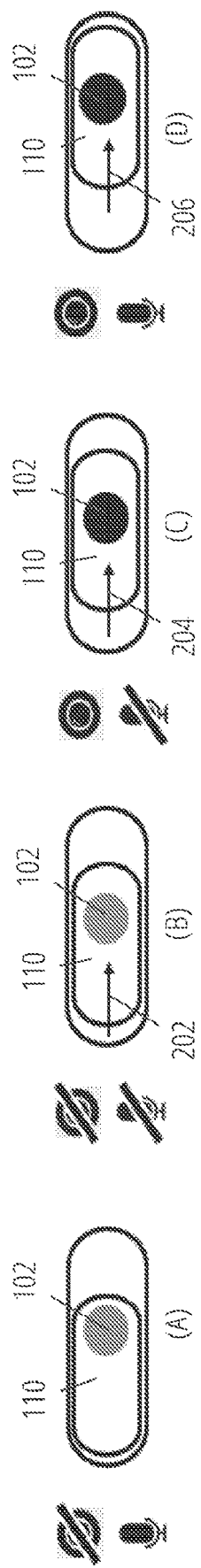
FIG. 2 illustrates the shutter slidable between various positions, according to an example.

FIG. 2 illustrates shutter 110 slidable between at least a first position (A), second position (B), third position (C), and fourth position (D), according to an example. As illustrated, while in the first position (A) and second position (B), the shutter 110 obscures the opening 108, thereby blocking lens 102 from capturing video or images (lens 102 indicated in grey). However, while in the third position (C) and fourth position (D), the shutter 110 exposes the opening 108, thereby making the lens 102 available for image or video capture (lens 102 indicated in black). By having two positions where the lens 102 is blocked (positions (A) and (B)), and two positions where the lens 102 is available for use (positions (C) and (D)), a user has the flexibility to either enable or disable the microphone 104 as well. For example, while the shutter 110 is in the first position (A), in addition to blocking lens 102, microphone 104 may be made available for use. Upon moving the shutter 110 to the second position (B), indicated by arrow 202, in addition to blocking lens 102, microphone 104 may be disabled. For example, the data signal for the microphone 104 may be disconnected, as mentioned above. Moving the shutter 110 to the third position (C), indicated by arrow 204, while making lens 102 available for use, the microphone 104 may remain disabled. Finally, moving the shutter 110 to the fourth position (D), indicated by arrow 206, both the lens 102 and microphone 104 may be made available for use, where, upon reconnection of the data signal for the microphone 104, audio may be captured by the microphone 104 and transmitted to the processor of the computing device 100. As further described, the computing device 100 may include switches, where a triggering of a switch may enable the microphone 104 for audio capture.

Figure 3:
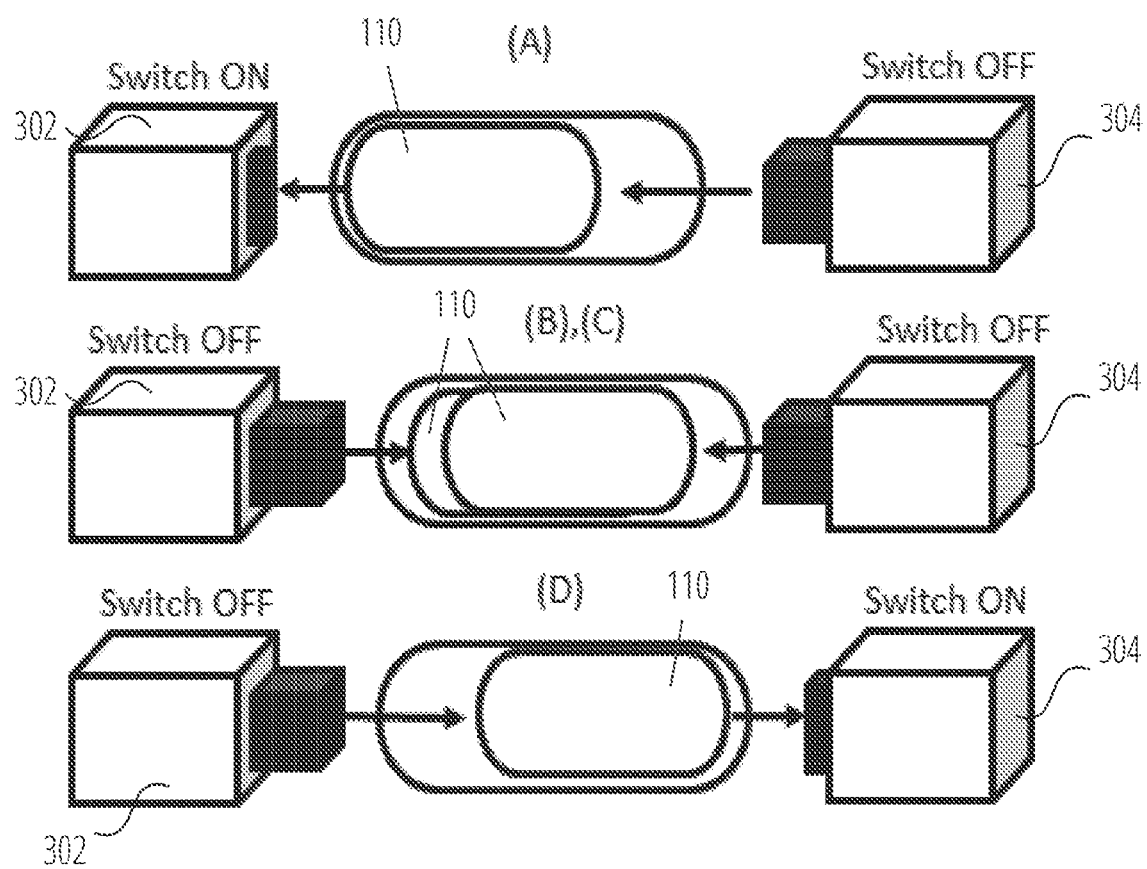
FIG. 3 illustrates the use of switches to either enable or disable a microphone, as the shutter is moved between the various positions, according to an example.

FIG. 3 illustrates the use of switches to either enable or disable the microphone 104, as the shutter 110 is moved between the first position (A), second position (B), third position (C), and fourth position (D), according to an example. As illustrated, the computing device 100 may include a first switch 302 and a second switch 304, disposed within the housing 106 of the computing device 100, on either end of the shutter 110. As an example, the computing device 100 may include an internal mechanism that triggers either the first switch 302 or second switch 304, based on the position of the shutter 110 (e.g., first position (A), second position (B), third position (C), or fourth position (D)). As described above, the circuitry associated with microphone 104 may use a clock signal and a data signal to transmit sound captured by the microphone 104 to a processor of the computing device 100, for example, for audio processing. By utilizing the first switch 302 and second switch 304, the data signal for the microphone 104 may be disconnected, based on a position of the shutter 110, thereby controlling whether audio is captured by the microphone 104 and transmitted to the processor. As an example, the switch may correspond to a conductive connection that is either engaged or disengaged, based on the position of the shutter 110. If the conductive connection for either the first switch 302 or second switch 304 is engaged, the data signal for the microphone 104 may be connected. However, if disengaged, the data signal for the microphone 104 may be disconnected.

As illustrated, while the shutter 110 is in the first position (A), the first switch 302 is triggered ("Switch ON"), thereby enabling the microphone 104 for use. However, while the shutter 110 is in either the second position (B) or third position (C), neither the first switch 302 or second switch 304 is triggered ("Switch OFF"), ensuring the privacy measure of disabling the microphone 104. Finally, while the shutter 110 is in the fourth position (D), the second switch 304 is triggered, thereby enabling the microphone 104 for use. As a result, a processor of the computing device 100 may receive data from the microphone 104 when either the first switch 302 or second switch 304 is triggered (first position (A) or fourth position (D)). Similarly, the processor may not be able to receive the data from the microphone 104 when neither the first switch 302 or second switch 304 is triggered (second position (B) or third position (C)). Although two switches are illustrated, the number of switches, and their placement within the computing device 100, may vary.

It is appreciated that examples described may include various components and features. It is also appreciated that numerous specific details are set forth to provide a thorough understanding of the examples. However, it is appreciated that the examples may be practiced without limitations to these specific details. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A computing device comprising:
a camera comprising a lens;
a microphone; and
a housing comprising:
an opening extending through the housing, wherein the opening is to accommodate the lens; and
a shutter to selectively obscure the opening, wherein the shutter is slidable between consecutive positions, the consecutive positions comprising:
a first position, wherein the shutter is to obscure the opening while the microphone is enabled; and
a second position different from the first position, wherein the shutter is to obscure the opening and disable the microphone.

2. The computing device of claim 1, wherein the shutter is further slidable between:
a third position, wherein the shutter is to expose the opening while the microphone is disabled; and
a fourth position different from the third position, wherein the shutter is to expose the opening and enable the microphone.

3. The computing device of claim 2, comprising a first switch and a second switch, wherein a triggering of either the first switch or the second switch is to enable the microphone.

4. The computing device of claim 3, wherein:
while the shutter is in the first position, the first switch is triggered;
while the shutter is in either the second position or the third position, neither the first switch or the second switch is triggered; and
while the shutter is in the fourth position, the second switch is triggered.

5. The computing device of claim 3, comprising a processor to receive data from the microphone when either the first switch or the second switch is triggered.

6. The computing device of claim 5, wherein, when either the first switch or the second switch is triggered, a conductive connection is established for the processor to receive the data from the microphone.

7. A computing device comprising:
a camera comprising a lens;
a microphone; and
a housing comprising:
an opening extending through the housing, wherein the opening is to accommodate the lens; and
a shutter to selectively obscure the opening, wherein the shutter is slidable between consecutive positions, the consecutive positions comprising:
a first position, wherein the shutter is to obscure the opening while the microphone is enabled;
a second position different from the first position, wherein the shutter is to obscure the opening and disable the microphone;
a third position, wherein the shutter is to expose the opening while the microphone is disabled; and
a fourth position different from the third position, wherein the shutter is to expose the opening and enable the microphone.

8. The computing device of claim 7, comprising a first switch and a second switch, wherein a triggering of either the first switch or the second switch is to enable the microphone.

9. The computing device of claim 8, wherein:
while the shutter is in the first position, the first switch is triggered;
while the shutter is in either the second position or the third position, neither the first switch or the second switch is triggered; and
while the shutter is in the fourth position, the second switch is triggered.

10. The computing device of claim 8, comprising a processor to receive data from the microphone when either the first switch or the second switch is triggered.

11. The computing device of claim 10, wherein, when either the first switch or the second switch is triggered, a conductive connection is established for the processor to receive the data from the microphone.

12. A computing device comprising:
a camera comprising a lens;
a microphone;
a first switch; and
a housing comprising:
an opening extending through the housing, wherein the opening is to accommodate the lens; and
a shutter to selectively obscure the opening, wherein the shutter is slidable between consecutive positions, the consecutive positions comprising:
a first position, wherein the shutter is to obscure the opening while triggering the first switch, wherein the triggering of the first switch is to enable the microphone; and
a second position different from the first position, wherein the shutter is to obscure the opening and disable the microphone, wherein, while in the second position, the shutter is to no longer trigger the first switch.

13. The computing device of claim 12, comprising a second switch, wherein the shutter is further slidable between:
a third position, wherein the shutter is to expose the opening while the microphone is disabled; and
a fourth position different from the third position, wherein the shutter is to expose the opening while triggering the second switch, wherein the triggering of the second switch is to enable the microphone.

14. The computing device of claim 13, wherein the triggering of either the first switch or the second switch is to enable the microphone.

15. The computing device of claim 13, wherein, while the shutter is in either the second position or the third position, neither the first switch or the second switch is triggered.

\* \* \* \* \*